United States Patent Office 3,681,196
Patented Aug. 1, 1972

3,681,196
MUCONIC ACID AND DERIVATIVES IN GIBBERELLIC ACID FERMENTATION
Herbert H. Eichhorn, Mystic, Conn., assignor to Pfizer Inc., New York, N.Y.
No Drawing. Filed Nov. 16, 1970, Ser. No. 90,137
Int. Cl. C12d 1/00
U.S. Cl. 195—36 R 5 Claims

ABSTRACT OF THE DISCLOSURE

A process for producing gibberellic acid which comprises propagating a gibberellic acid producing strain of *Gibberella fujikuroi* under aerobic conditions in an aqueous carbohydrate-containing medium in the presence of muconic acid or its derivatives.

BACKGROUND OF THE INVENTION

This invention relates to an improved method for increasing the yield of gibberellic acid by gibberellic acid-producing fungi such as *Gibberella fujikuroi* by the addition of muconic acid, or its derivatives, in its production by fermentation.

Gibberellic acid, described in U.S. Pat. 2,842,051, is active as a plant growth stimulant. The production of gibberellic acid is now a commercial enterprise. However, the yield of this valuable plant growth stimulant per unit volume of employed fermentation medium is very low. Attempts to improve the yield by making numerous variations in usual constituents of the nutrient medium and in operating conditions have not brought about significant changes in the yields. Accordingly, any means by which substantial increases in yield can be obtained are of great practical significance.

Organic compounds that enhance fermentation product yields may do so by direct molecule incorporation or the fermentation degradative fragments may provide additional building blocks for the metabolic synthesis of the desired end fermentation product. These relatively simple organic compounds chosen for addition to the fermentation media are selected on the basis of insight into possible structural relationships.

SUMMARY OF THE INVENTION

In general, this invention relates to a process for increasing gibberellic acid fermentation yields by the addition of muconic acid, or derivatives thereof, to the fermentation media at a level of at least about 500 p.p.m. w./v.

DETAILED DESCRIPTION OF THE INVENTION

A process for the production of gibberellic acid involves the cultivation of a gibberellic acid producing strain of *Gibberella fujikuroi* in an aqueous nutrient medium at a temperature of about 25–33° C., preferably 27° C., and under submerged conditions with agitation and aeration. Nutrient media which are useful for this process include a carbon source such as sugars or glycerol; a source of organic nitrogen such as that contained in casein, soybean meal, peanut meal, wheat gluten, lactalbumin or cotton seed meal; an ammonium salt and a phosphate. The pH of the medium (approximately 4.5 to 5.5) is not adjusted after medium make-up or controlled during the course of the fermentation. If excessive foaming is encountered during the fermentation, anti-foaming agents such as vegetable oils or silicones may be added to the fermentation medium.

Muconic acid (2,4-hexadiene-1,6-dioic acid), or a derivative thereof, is added to the fermentation media at a concentration of at least about 500 p.p.m. w./v., a concentration which provides about a 10% increase or more in gibberellic acid yield. Muconic acid concentrations of 250 p.p.m. w./v. or less produce little or no stimulatory effect on gibberellic acid potencies. It is understood that the use of muconic acid includes a potential source of muconic acid such as the alkali metal, alkaline earth salts, i.e., the sodium, potassium, calcium, magnesium or ammonium salts; derivatives such as esters, amides, nitriles or other compounds which are converted to the free acid or its salts during the fermentation process.

The manner in which the muconic acid or its derivatives is added to the nutrient medium is not critical. When these compounds are to be present during the entire fermentation period, they may be incorporated in the medium before its sterilization. When they are to be added to the media in which the mold growth has already become established, they may be added as solutions in water or organic solvents.

Inoculum for the preparation of gibberellic acid by the growth of a strain of *Gibberella fujikuroi* may be obtained by employing growth from slants of such media as Emerson's agar or beef lactose agar. The growth may be used to inoculate either shaken flasks or stirred fermenters for submerged growth. Variations in the equipment used, the rate of aeration, rate of stirring, etc. may effect the speed with which the maximum activity is reached. In general, about 115 to about 170 hours is the desired period for producing gibberellic acid. Aeration of the medium is stirred fermenters is maintained at the rate of about 8 cubic feet per hour per gallon of medium. Agitation may be maintained by suitable types of agitators generally familiar to those in the fermentation industry.

The quantitative determination of gibberellic acid in filtered fermentation broths is based on the principle that gibberellic acid undergoes degradation in the presence of hydrochloric acid forming gibberellinic acid. This material has strong absorbance in the ultra-violet light region at 254 m$\mu$. The absorbance of gibberellinic acid in the acid treated fermentation broth is correlated with the gibberellinic acid obtained by the acid treatment of standard solutions of pure gibberellic acid.

Recovery of gibberellic acid from filtered fermentation broths is accomplished by means generally familiar to those skilled in the art, such as charcoal adsorption and elution and extraction with water-immiscible organic solvents.

The present invention embraces not only the use of the herein described organism but also of mutants thereof produced by subjecting the organism to such measures as treatments with X-rays, ultraviolet light, nitrogen mustard and the like.

The following examples are merely illustrative and are not intended to limit the invention, the scope of which is defined by the appended claims.

Example I

An inoculum is prepared using a growth medium having the following composition:

| | | Amount/liter |
|---|---|---|
| Tomato juice | ml | 100 |
| $MgSO_4 \cdot 7H_2O$ | gm | 0.2 |
| $KH_2PO_4$ | gm | 0.12 |
| $K_2HPO_4$ | gm | 0.18 |
| $(NH_4)_2SO_4$ | gm | 0.5 |
| Acetic acid | ml | 2.0 |
| $CaCl_2 \cdot 2H_2O$ | gm | 0.248 |
| Yeast extract | gm | 0.25 |
| Biotin | gm | 0.000005 |

The medium is adjusted to pH 7.0 with potassium hydroxide, and then sterilized and cooled. Spores of an Emerson agar slant of *Gibberella fujikuroi* NRRL No. A6831 are transferred under aseptic conditions into 20 ml. of water, and a homogeneous suspension of spores is obtained by shaking. Six ml. of this suspension is transferred into 750 ml. of the above medium in a 2.8 liter Fernbach flask, and shaken for 48 hours at 30° C.

A nutrient medium is prepared having the following composition:

| | Grams/liter |
|---|---|
| Cerelose | 70.0 |
| Cotton seed meal | 40.0 |
| $KH_2PO_4$ | 0.5 |
| $(NH_4)_2SO_4$ | 0.7 |

Muconic acid (trans,trans), 1000 p.p.m. w./v.

A 10% inoculum of *Gibberella fujikuroi* is transferred under aseptic conditions into the above nutrient medium. The inoculated medium is stirred for 116 hours at 1700 r.p.m., with aeration of 8.0 cubic feet of air per hour per gallon, and a temperature of 27° C. The average yield of gibberellic acid is 1100 γ/ml. The potency of the control medium (without added muconic acid) averages about 1000 γ/ml.

Example II

The process of Example I is repeated with 500 p.p.m. w./v. of muconic acid in place of 1000 p.p.m. w./v., with comparable results.

Example III

The process of Example I is repeated with the muconic acid replaced by the sodium, potassium or calcium salt of muconic acid, with comparable results.

Example IV

The process of Example I is repeated with the muconic acid replaced by the methyl ester of muconic acid, with comparable results.

Example V

The process of Example I is repeated with the muconic acid replaced by the amide of muconic acid, with comparable results.

Example VI

The process of Example I is repeated with the muconic acid replaced by the nitrile of muconic acid, with comparable results.

What is claimed is:

1. In the process for producing gibberellic acid by propagating a gibberellic acid producing strain of *Gibberella fujikuroi* in an aqueous nutrient medium, the improvement which comprises conducting the fermentation in the presence of muconic acid, or a derivative thereof, at a level of at least about 500 p.p.m. w./v.

2. The process of claim 1 wherein said derivative is the sodium, potassium or calcium salt of muconic acid.

3. The process of claim 1 wherein said derivative is the methyl ester of muconic acid.

4. The process of claim 1 wherein said derivative is the amide of muconic acid.

5. The process of claim 1 wherein said derivative is the nitrile of muconic acid.

References Cited

UNITED STATES PATENTS 2,918,413  12/1959  Redemann _____ 195—36 R
2,977,285  3/1961   Birch et al. _____ 195—36 R LIONEL M. SHAPIRO, Primary Examiner G. M. NATH, Assistant Examiner U.S. Cl. X.R.

195—114